Patented Sept. 2, 1947

2,426,736

UNITED STATES PATENT OFFICE 2,426,736

BREAD IMPROVER

Willis S. Hutchinson, St. Paul, and Richard I. Derby, Minneapolis, Minn., assignors to The Mathieson Alkali Works, Inc., New York, N. Y., a corporation of Virginia No Drawing. Application February 16, 1944, Serial No. 522,624

5 Claims. (Cl. 99—91)

This invention relates to a composition of matter adapted for use in the making of bread and the like. It relates more particularly to what is known as a "bread improver" in that, by its use, a baked product having superior properties, including improved volume, grain and texture may be produced.

Bread improvers are extensively used by the baking industry as an ingredient of bread dough to improve the quality of the baked product. In certain crop years, it has been found that the physical properties of gluten are deficient and, to improve these properties, it has been customary to add to the dough, bread improvers containing active oxidizing agents such as bromates, iodates and persulfates.

While bread improvers containing these oxidizing agents have been found effective in improving the gluten of the dough, their use has not been wholly satisfactory. Some such bread improvers have been found to leave an objectionable residue in the bread. For example, the residue left by potassium bromate is potassium bromide, a well-known sedative. From a public health standpoint it is preferable not to have any substantial quantity of a sedative such as bromide in bread.

In Patent No. 2,365,534, which issued on December 19, 1944, on application of Charles G. Ferrari, there is disclosed a novel bread improver comprising a relatively small proportion of an edible alkali or alkaline earth salt of chlorous acid, such as sodium, potassium, ammonium or calcium chlorite, dispersed in an edible carrier or filler having a low moisture content and which is inert with respect to the chlorite. The moisture content of said bread improver, as disclosed in said patent should not substantially exceed 9% by weight, and the product has been found to be remarkably stable and adapted to be packaged and sold to the trade without material deterioration over substantial periods of time.

The present invention constitutes an improvement over the product of said Ferrari patent. It likewise relates to a bread improver comprising a relatively small proportion of an edible alkali or alkaline earth salt of chlorous acid, such as sodium chlorite, potassium chlorite, ammonium chlorite or calcium chlorite, thoroughly incorporated in an edible filler or carrier having a low moisture content, but in addition thereto contains a minor proportion of ammonium sulfate.

The use of chlorites as bread improvers has previously been suggested and, when used under certain conditions, they have been found to give superior results. However, their use as bread improvers has in the past not been found satisfactory because of their instability when prepared for convenient, practical use in the industry.

For instance, the proportion of the chlorite used for such purpose is extremely small and to be effective, the chlorite must be uniformly dispersed throughout the dough. Normally not over a few thousandths of a percent of the chlorite is desired.

To relieve the baker of the necessity of such careful weighing of the chlorite, and to facilitate its dispersion in the dough, it has been suggested that the chlorite be supplied to the baker admixed with flour. For instance, it has been proposed that the chlorite be incorporated with the flour during the grinding process.

Where the chlorite has been pre-mixed with flour, the results have lacked uniformity and have been generally unsatisfactory for, though the chlorites are normally relatively stable, the admixture of the chlorites with ordinary flour appears to be unstable and the effectiveness of the chlorite in the mixture as a bread improver rapidly diminishes upon standing.

As set forth in the above-noted patent, it has now been found that uniformly superior results may be obtained by incorporating in the dough a previously prepared bread improver comprising an intimate blend of the chlorite with flour or a similar edible starchy substance, as a carrier, provided the moisture content of the blend is sufficiently low. It appears that the unsatisfactory results heretofore obtained by the use of these chlorites as bread improvers were due, in part, at least, to the instability of the chlorite in the presence of ordinary flour, the moisture content of which usually substantially exceeds 9% by weight.

By maintaining the moisture content of the mixture at a value not substantially exceeding 9% by weight, the chlorites may be supplied to the baker in a powdered condition in admixture with a relatively large proportion of finely-divided edible carrier or filler such as corn, rice, tapioca or other edible starches or cereal flours such as wheat or rice flour pre-dried to a moisture content not substantially exceeding 9% by weight. In such dry conditions, these carrier materials have been found to be substantially chemically inert with respect to the chlorite. Bread improvers of this type may be prepared, for example, by admixing the chlorite and carrier in proportions of about 0.2 part of chlorite to 99.8 parts of a carrier such as mentioned above, preferably a starchy material which is chemically inert with respect to the constituents of the dough. Such powdered mixture may be packaged and sold as such to the baker who may employ it, in making bread dough, in proportions of about 0.5% of the packaged mixture on the weight of the flour used.

In said Ferrari patent, it has been proposed to include in the chlorite bread improver a minor proportion of ammonium chloride for the purpose of stimulating the yeast growth and activity. Such use of ammonium chloride as a yeast food has been found greatly to enhance the effectiveness of the resultant bread improver.

It has been found, however, that, under prolonged, adverse storage conditions, there is a tendency for the chlorite in such admixtures containing ammonium chloride to decompose, resulting in a loss of effectiveness of the improver. For instance, where the compounded mixture is permitted to remain in storage or on the market shelf for extended periods of time, particularly under warm, humid conditions, or where purchase by the baker in large containers which are frequently opened for the removal of small amounts of the compound therefrom and the container not properly closed, a substantial loss of chlorite effectiveness will occur.

We have discovered that ammonium sulfate may, with advantage, be substituted for the ammonium chloride previously proposed. In the environment of the chlorite admixture we have found ammonium sulfate to be fully as effective as ammonium chloride as a yeast food and, further, that the stability of the chlorite bread improver is not adversely affected by the presence of the ammonium sulfate.

We cannot at present account for this surprising difference in the effect of ammonium chloride and ammonium sulfate on the stability of the chlorite bread improver but we have consistently found, by extensive tests under comparable conditions, that the chlorite bread improvers of our present invention containing ammonium sulfate are surprisingly more stable than those containing ammonium chloride, as hereinafter illustrated.

In accordance with our present invention, the deterioration of bread improvers of this type by decomposition of the chlorite of the mixture is to a large measure, if not completely, prevented, even under such adverse conditions, and the storage or shelf life of the product materially increased.

Further, bread improver of our present invention may be packaged and stored more economically as the importance of protecting the product from atmospheric moisture is not so great. Less expensive containers may be used in the packaging of our bread improver, for instance containers less impervious to moisture.

It will, of course, be understood that the relative proportions of chlorite, ammonium sulfate and inert filler of the mixture and the proportions of the mixture added to the dough may be varied according to the baking properties of the particular flour being used in making the dough. For example, larger proportions of chlorite and ammonium sulfate may be incorporated in the mixture and a smaller proportion of the mixture used in making the dough, or the bread improver may be prepared in a less concentrated form and correspondingly larger amounts used. It is usually preferable to use a large proportion of the carrier so as greatly to increase the bulk of the bread improver and thereby relieve the baker of tedious weighing and facilitate dispersion of the chlorite and ammonium sulfate through the dough.

The proportion of ammonium sulfate used in accordance with our invention is not critical and may be varied over a considerable range, as required. The optimum proportion will depend largely upon the proportion of chlorite in the mixture and the anticipated use of the product. Generally, proportions of ammonium sulfate of about 5–15% of the formula weight will be found desirable but greater or even less amounts, sufficiently to stimulate the yeast growth or activity may be used with advantage.

An example of suitable compositions which have given superior results as bread improvers and been shown by extensive tests to maintain their effectiveness over prolonged storage periods under adverse conditions, was prepared from the following ingredients and proportions thereof, the proportions being by weight:

| | Per cent |
|---|---|
| Sodium Chlorite | 0.25 |
| Ammonium Sulfate | 12.10 |
| Calcium Sulfate ($CaSO_4 \cdot 2H_2O$) | 25.00 |
| Sodium Chloride | 25.00 |
| Corn Starch Filler | 37.65 |

Our improved product, of which the foregoing formula is illustrative, may be compounded by adding and admixing all of the components simultaneously in a finely-divided state to form an intimate, homogeneous mixture. Products such as illustrated may be used by the baker, for example, in proportions of about one-half pound of the mixture to one hundred pounds of flour. The presence of the ammonium sulfate during the mixing operation has been found to exert a restraining influence upon the explosibilty of the chlorite mixture under compounding condition, and accordingly by its use the compounding operation is simplified and rendered less hazardous. Regardless of the presence of the ammonium sulfate, no hazard whatever is involved in the handling, shipping, storage or use of the compounded chlorite bread improvers of the types herein described.

It is generally recognized in the baking industry that flours may vary from year to year as to their baking characteristics. For each flour there is an optimum quantity of bread improver for the production of bread having the desired volume, grain, texture and dough-handling characteristics. Accordingly, the quantity of chlorite and ammonium sulfate used in the bread improver may be varied from year to year according to the requirements of the particular flour with which it is used. Preferably, however, the proportions of chlorite and ammonium sulfate in the bread improver are maintained constant and the variation in the requirements for different types of flour is taken care of by varying the amount of bread improver employed. In any event, the important consideration is the amount of chlorite and ammonium sulfate added to the dough mix and it is relatively immaterial, within limits, how much inert carrier is employed. If desired, yeast foods in addition to the ammonium sulfate may be used. Sodium chloride, calcium sulfate and the like may be included, as desired. Constituents in proportions about those of the foregoing illustration have been found to be generally suitable.

Further, it has been found by experimental baking tests that, with certain bread flours, the desired characteristics of the dough and bread baked therefrom are more readily obtainable when a suitable mixture of oxidizing agents such as one of the chlorites mentioned above and a suitable small amount of additional oxidizing agent, such as persulfate, iodate or bromate is employed. Where such additional oxidizing agent is used, proportions of about 0.1% of the formula weight have been found to give generally satisfactory results.

The bread improver of the present invention, whether containing only ammonium sulfate and a chlorite, such as previously mentioned, as the active ingredients or having incorporated therein an additional yeast food or, in addition thereto, a smaller quantity of some other oxidizing agent, such as previously mentioned, has been found to leave no objectionable residue in the baked product. Such residue as formed is wholly innocuous and is entirely unobjectionable from a public health standpoint. For instance, the residue left by sodium chlorite is sodium chloride, i. e., ordinary table salt.

Though each of the chlorites previously mentioned is suitable for use in the bread improver of our present invention, at present sodium chlorite is preferable, due to its readily commercial availability in a satisfactory form. Chlorite suitable for the purpose herein set forth may be prepared as described in the United States Patents Nos. 2,092,944, 2,092,945 and 2,169,066. The calcium and ammonium chlorites are regarded as particularly advantageous for the reason that calcium and $NH_4$ ions are recognized yeast stimulants and yeast foods.

As previously noted, the optimum proportion of chlorite to be incorporated with the dough depends largely upon the peculiarities of the particular flour used. However, satisfactory results are usually obtained where the amounts and concentrations of the bread improver used are such that the proportion of chlorite incorporated in the dough is from about 0.2 milligram to about 2 milligrams per 100 grams of flour.

The use of bread improvers of this type is especially advantageous for doughs having a tendency to become sticky. It has been found that their use under such circumstances generally results in a drier and more pliable dough than is otherwise readily obtainable.

Further, the characteristics of the resulting baked products are materially improved by the use of bread improvers of the present type. For instance, the grain and texture of the bread are improved and the cell structure is thereby changed from a heavy walled spherical cell to substantially thinner walled elongated cells, with the result that the bread has a silky texture and better eating characteristics.

The composition of the bread improver mixture should normally be such as to give in aqueous solution of a pH value on the acid side. However, the characteristics of the mixture may be either acid or alkaline, as desired, for instance, by the addition of buffer salts, such as mixtures of phosphates, without detrimentally affecting the stability of the chlorite.

The improved stability of the product of our present invention over chlorite improvers of this type containing ammonium chloride has been illustrated by tests carried on under particularly adverse conditions for the purpose of accelerating the deterioration and loss of the chlorite constituent of the product. For comparison, a bread improver of this type, in which ammonium chloride was substituted for the ammonium sulfate of the present invention, was subjected to identical tests. The bread improver of our present invention subject to these tests was one compounded from the ingredients and proportions thereof set forth herein in the previous tabulation and the bread improver containing ammonium chloride, instead of ammonium sulfate, was prepared from the following ingredients and proportions thereof, by weight:

| | Per Cent |
|---|---|
| Sodium chlorite | 0.25 |
| Ammonium chloride | 9.8 |
| Calcium sulfate ($CaSO_4.2H_2O$) | 25.00 |
| Sodium chloride | 25.00 |
| Corn starch filler | 39.95 |

The latter mixture, as initially prepared, contained 4.3% of water and 0.257% sodium chlorite. The product of our invention subjected to these tests initially contained 3.9% water and 0.259% of sodium chlorite.

Three samples of each of these materials were placed in one pound friction top fiber containers and the containers placed in a closed cabinet maintained at a temperature of 90° F. and under high humidity. On a sample of each of the materials the lid of the container was left off completely, on another sample of each of the materials, the lid of the container was left loose and on another sample of each of the materials, the lid of the container was tightly closed.

At the end of about a two-month period, under such conditions, the sodium chlorite content of the upper portion of the sample containing ammonium chloride, on which the lid was left off, was found to have dropped to 0.02%, while the sodium chlorite content of the corresponding sample containing ammonium sulfate had dropped only to 0.23%. Of those samples on which the lids of the containers were left loose, the sodium chlorite content of the upper portion of that containing ammonium chloride had likewise dropped to 0.02%, while that containing ammonium sulfate had dropped only to 0.24%. Of those samples on which the container lids were closed, the sodium chlorite content of the upper portion of that containing ammonium chloride had dropped to 0.22% while that containing ammonium sulfate had dropped to only 0.25%. The product of our present invention in the closed container, after subjection to this accelerated deterioration test over a six-month period, was found still to contain 0.24% of sodium chlorite.

Similar tests carried out under various conditions designed to accelerate deterioration of the product have consistently shown that our improved product is vastly more stable than previously known bread improvers of this general type containing ammonium chloride. While we cannot at present explain the reason for this increased stability, extensive tests have shown that improved stability invariably results.

We claim:

1. A bread improver comprising an intimate admixture of a chlorite of the group consisting of sodium, potassium, ammonium and calcium chlorite, ammonium sulfate and an edible carrier which is inert with respect to the chlorite, the moisture constituent of the mixture not substantially exceeding 9% by weight.

2. A bread improver comprising an intimate admixture of a chlorite of the group consisting of sodium, potassium, ammonium and calcium chlorite, ammonium sulfate and an edible starchy material, as a carrier, the moisture content of the mixture not substantially exceeding 9% by weight.

3. A bread improver consisting of an intimate powdered admixture comprising about 0.2 parts, by weight, of sodium chlorite, about 99.8 parts of an edible starchy material, as a carrier, not in excess of about 9% of moisture and an amount of ammonium sulfate effective as a yeast food.

4. A bread improver consisting of an intimate powdered admixture comprising about 0.2 part, by weight, of sodium chlorite, about 99.8 parts of dry cornstarch, as a carrier, not in excess of about 9% of moisture and an amount of ammonium sulfate effective as a yeast food.

5. A bread improver comprising an intimate powdered admixture of the following constituents in proportions by weight substantially as indicated:

| | Parts |
|---|---|
| Sodium chlorite | 0.25 |
| Ammonium sulfate | 12.10 |
| Sodium chloride | 25 |
| Calcium sulfate | 25 |
| Starch | 37.65 | and containing not in excess of about 9% of moisture.

WILLIS S. HUTCHINSON.
RICHARD I. DERBY.

REFERENCES CITED

The following references are of record in the file of this patent:

UNITED STATES PATENTS

| Number | Name | Date |
|---|---|---|
| 2,365,534 | Ferrari | Dec. 19, 1944 |
| 2,040,249 | Epstein | May 12, 1936 |
| 2,185,368 | Bowen | Jan. 2, 1940 |
| 1,643,012 | Hill | Sept. 20, 1927 |
| 1,131,698 | Hobbs | Mar. 16, 1915 |
| 1,158,933 | Kohman | Nov. 2, 1915 |
| 2,033,180 | Bunzell | Mar. 10, 1936 |
| 2,071,091 | Taylor | Feb. 16, 1937 |
| 2,071,094 | Vincent | Feb. 16, 1937 |

FOREIGN PATENTS

| Number | Country | Date |
|---|---|---|
| 116,149 | Australia | 1942 |
| 117,834 | Austria | 1930 |
| 263,760 | Great Britain | 1926 |